United States Patent
Kiyko

(10) Patent No.: US 8,406,098 B2
(45) Date of Patent: Mar. 26, 2013

(54) DEVICE FOR RECORDING, ERASING AND READING DATA ON A MULTI-LAYER OPTICAL DISC

(75) Inventor: Vadim Veniaminovich Kiyko, Moskovskaya obl. (RU)

(73) Assignee: Everhost Investments Limited, Nicosia (CY)

( * ) Notice: Subject to any disclaimer, the term of this patent is extended or adjusted under 35 U.S.C. 154(b) by 0 days.

(21) Appl. No.: 13/427,547

(22) Filed: Mar. 22, 2012

(65) Prior Publication Data

US 2012/0182846 A1 Jul. 19, 2012

Related U.S. Application Data

(63) Continuation of application No. PCT/RU2010/000508, filed on Sep. 9, 2010.

(30) Foreign Application Priority Data

Sep. 25, 2009 (RU) .............................. 2009136388

(51) Int. Cl.
*G11B 7/00* (2006.01)
(52) U.S. Cl. ................. 369/44.14; 369/112.01; 369/286
(58) Field of Classification Search ............... 369/44.14, 369/47.17, 53.28, 53.33, 112.01, 286
See application file for complete search history.

(56) References Cited

U.S. PATENT DOCUMENTS 5,268,862 A 12/1993 Rentzepis

2004/0257962 A1 12/2004 Walker et al.
2005/0270955 A1 12/2005 Hirai

OTHER PUBLICATIONS

Satoshi Kawata, et al., Three-Dimensional Optical Data Storage Using Photochromic Materials, Chem. Rev. 2000, 100, 1777-1788 (Apr. 25, 2000).
Yoshimasa Kawata, et al., Three-dimensional optical data storage using three-dimensional optics, Opt. Eng. 40(10) 2247-2254 (Oct. 2001).
International Search Report from correspondent International Application PCT/RU2010/000508 filed Sep. 9, 2010, mailed Jan. 20, 2011.
International Preliminary Report on Patentability with Written Opinion from correspondent International Application PCT/RU2010/000508 filed Sep. 9, 2010, mailed Mar. 27, 2012.

*Primary Examiner* — Wayne Young
*Assistant Examiner* — Brenda Bernardi
(74) *Attorney, Agent, or Firm* — Patenbar International, P.C.

(57) ABSTRACT

The invention relates to three-dimensional optical memory devices and can be used in all areas of computing in which it is necessary to record large data files on compact carriers, and also for recording, erasing and reading video data, for example, in independent video viewing systems. The device comprises an optical disc positioning system, a source of radiation with two different wavelengths that is optically coupled to a focusing system, focusing system positioning means, and an optical sensor that is optically coupled to the focusing system via a spectrum splitter and an controlled spectrum selector placed between the source of radiation with two different wavelengths and the spectrum splitter, wherein the focusing system is designed with longitudinal chromatic aberration at the given wavelengths.

1 Claim, 3 Drawing Sheets a)

b)

a)

b)

DEVICE FOR RECORDING, ERASING AND READING DATA ON A MULTI-LAYER OPTICAL DISC

RELATED APPLICATIONS

This Application is a Continuation application of International Application PCT/RU2010/000508 filed on Sep. 9, 2010, which in turn claims priority to Russian application No. RU2009136388 filed on Sep. 25, 2009, both of which are incorporated herein by reference in their entirety.

FIELD OF THE INVENTION

The invention relates to three-dimensional (3D) optical memory devices and, more specifically, to devices used for recording, erasing and reading data on a multilayer optical recording medium. The device as claimed in the invention may be used in all areas of computing that require recording large files of information on compact carriers. It is also may be used for recording and reading video data, for example, in independent video observation systems.

BACKGROUND OF THE INVENTION

Among the most important technical problems facing the designer of effective systems using laser radiation for recording information on 3D media, particularly on multilayer optical discs, is the one of positioning the laser beam in the recording area inside the 3D medium so that a change in the optical properties of the recording medium as a result of storage of information is precisely localized in space. The change in the optical properties in this case may be defined as a change in the refraction index, absorption index, scattering coefficient or other optical, e.g. fluorescent, properties of the medium. The space occupied by recording one bit of data (pixel) must be minimized thus increasing the data recording density and volume for storage of data on one medium. The minimum lateral dimension of a pixel is limited to a value of about half the wavelength of the recording radiation. This directly follows from the diffraction theory and so is a fundamental physical limitation. By recording data with use of short-wave optical radiation and short-focus optical systems with large numerical apertures and corrected spherical aberration which focus this radiation within the recording medium one can obtain a high volume density of the recorded information.

Known in the art is a 3D device for recording and reading information (Kawata Y., Nakano M., Lee S-C. Three-dimensional optical data storage using three-dimensional optics.— Optical Engineering, vol. 40 (10), p. 2247-2254). This paper describes various (one-photon and two-photon) media and various versions of a device for recording, erasing and reading information, based on the principle of confocal microscopy. This device records information by focusing the radiation using the recording wavelength within the material and changing the refraction index of said material by exposing it to the radiation. The recorded data is then read out by registering the regions with the changed refraction index by the value of phase distortion of the reading light beam with a wavelength other than that of the recording radiation. The authors of the above paper point out the disadvantages of the proposed means and devices. The cross-talk between the layers is great where one-photon media are used, while the use of two-photon media requires a more powerful and shorter recording laser pulse, which makes the miniaturization of the laser source impossible. Besides, since the method of measurement of phase disturbances is highly sensitive, the data recording requires media with very high optical homogeneity of material and optical surface quality.

Also known in the art is a device for recording, erasing and reading the data within a photochromic material, typically spirbenzopyran, maintained in a 3D matrix, typically of polymer (U.S. Pat. No. 5,268,862. Three-dimensional optical memory, publ. Dec. 7, 1993). The device comprises laser radiation sources and systems for optical positioning and focusing of the laser beams. The material used for recording has two stable forms, spiropyran and merocyanine. Transition from the first form to the second is performed through a two-photon absorption occurring on the wavelength of 532 nm. The recording medium is illuminated by two focused laser beams with the specified wavelength in two mutually perpendicular directions. In this manner the spatial positioning of the area of interaction of two laser beams in a 3D space is achieved, while the conversion of the first form of the photochromic material into the other only occurs where the focal regions of the beams intersect. The second form of the photochromic material exhibits fluorescence when exposed to irradiation with light on a wavelength of 1,064 nm. As the material is irradiated, one can read the information by using the said fluorescence. The information recorded on a 3D material can be erased by heating the medium, total or local, say, by irradiating it with light having a wavelength of 2.12 μm. The disadvantages of this device are mostly analogous to those of the one described above. Inasmuch as the process of conversion of the recording material from one form to the other is a two-photon one, it is necessary to use radiation sources having a super-high peak power. The need for positioning the point of intersection of the focal regions of two orthogonal beams within the volume of the material limits the degree of decreasing the volume of recording one bit of information by the given device to units and tens of micrometers, while potentially the light beam can be focused onto an area with a lateral dimension less than micron. Moreover, the degree of optical homogeneity of the medium and quality of the surfaces limiting the volume with the photochromic material must be very high. Where polymers are used as a binding matrix, obtaining the required optical quality under the conditions of serial production of 3D photochromic materials is quite problematic.

Also known in the art is device for recording/reading optical information on a multilayer recording medium (U.S. Pat. No. 7,345,967. Optical pickup unit. Publ. Mar. 18, 2008), comprising a source of radiation, a beam splitter, a controlled spherical aberration corrector and an objective lens as well as an optical sensor (photo receiver) optically coupled with the objective lens via the beam splitter, all arranged in series in the direction of the beam. The given device records and reads information by radiation on one wavelength. The operating modes of the device are selected by changing the power of the radiation aimed at the radiation recording medium. The main disadvantage of this device resides in an inevitable danger of losing the recorded information during readout. To mitigate it in the prior art device, it is suggested to decrease the radiation source power during information read-out down to the minimum permissible values at which the useful signal only slightly exceeds the noise level.

The problem of losing information during its read-out is particularly acute where materials with one-photon mechanisms of interaction of light with substance are used as the 3D recording media. In real light fluxes required for reading information using the changes in the optical density of the medium the information is erased within 5-10 reading cycles. To solve the given problem, some authors propose the method of reading information by using radiation on a wavelength located at the optical absorption edge of the photochromic material (see Satoshi Kawata, Yoshimasa Kawata. Three-dimensional optical data storage using photochromic materials. Chem. Rev. 2000, 100, 1777-1788). In this method, the volume of a pixel increases in real practice ten- or even hundredfold. Besides, where one-photon media are used practically all authors also point out a slight crosstalk between the layers carrying the recorded information.

Considering the above, the most justified option to choose in this case seems to be the one involving recording/erasing information using the threshold two-photon media in which information is recorded and erased only when a certain threshold intensity of light has been reached. However, such media require very high radiation power for reading and erasing information, while the practical embodiment of such power at present in miniaturized devices is impossible.

From the viewpoint of practical embodiment, the simplest system for reading/erasing information in 3D media is represented by a device comprising two sources of radiation with different wavelengths, optically coupled with one focusing system having the means for controlling the position of the focusing region within the 3D medium, a spherical aberration correction unit as well as a receiver of optical radiation emitted by the 3D medium during read-out of the information recorded on it (U.S. Pat. No. 7,436,750. Optical storage with ultrahigh storage capacity, publ. Oct. 14, 2008). In this device, while information is recorded, a radiation having wavelength $\lambda 1$ is focused onto the recording medium consisting of alternating layers of transparent and photochromic materials. When exposed to said radiation, the photochromic material in the selected recording layer changes its optical properties and develops a capacity, when exposed to a radiation having wavelength $\lambda 2$, to fluoresce on wavelength $\lambda 3$. As the information is being read out, the radiation having wavelength $\lambda 2$ is focused onto the recording medium. The fluorescent light emitted by the photochromic material on wavelength $\lambda 3$ within the limits of the pixels previously exposed to the light with wavelength $\lambda 1$ and containing bits of information is registered by an optical sensor (photo receiver). This system illustrates, more than any other, the technical essence of the claimed device and so is accepted by the authors as the prototype.

The main disadvantage of the prototype resides in the low density of the recorded information, which is due to the cross-talk between the layers of the photochromic material. The cross-talk occurs as a result of the fact that when information is recorded onto a deep-lying signal layer of the photochromic material the radiation with wavelength $\lambda 1$ passes through the higher-positioned photochromic layers thus inevitably inducing in the latter the same processes as those occurring in the signal layer while the information is recorded. To decrease the crosstalk between the photochromic layers, it is necessary to either reduce their number, or increase the thickness of the layers of the transparent material between them. Neither solution of the problem is optimal and results in either limiting the maximum volume of data that can be recorded on one data medium or increasing the thickness of the multilayer optical disc and thus reducing the recording density. There are two methods used to suppress the cross-talk between the layers in practical embodiment of the prototype: the first method uses, as a source of recording radiation, a powerful laser which initiates the two-photon data recording process in the signal photochromic layer, and the other has an optical layout to register fluorescent light, which comprises a chromatic aberration compensation element, short-focus objective lens and an aperture diaphragm of several microns, all arranged in series thus forming a confocal train for registering the fluorescence radiation. The use of the confocal registration layout markedly reduces the value of the useful fluorescent signal, so a photomultiplier is proposed to be used in the prototype as a fluorescent light detector. On the one hand, the practical embodiment described in the prototype confirms existence of a serious problem with the cross-talk between the layers, while on the other hand the state-of-the-art technology makes impossible application of the prototype in the production of commercial information recording devices based on multilayer optical discs because of the high cost and complex design of the device.

SUMMARY OF THE INVENTION

The task to be solved by this invention is to increase the recorded data density on a multilayer optical disc while simultaneously simplifying the design of the device.

This task can be solved through achieving a technical result consisting in decreasing the cross-talk between the photochromic layers of the multilayer optical disc when information is recorded on it and reduce the probability of losing the recorded information during readout of the latter.

In the claimed invention the technical result is achieved by using a device for recording/erasing/reading information on a multilayer optical disc, comprising an optical disc positioning system, a source of radiation using two different wavelengths and optically coupled with a focusing system provided with a focusing means, an optical sensor (photo receiver) optically coupled with the focusing system via a spectrum splitter, a control and data processing unit electrically connected to the radiation source, focusing system positioning means and optical sensor, additionally contains a controlled spectrum selector at whose output the required ratio of light beam intensities can be set for each of the two wavelengths, said selector being arranged between the radiation source and the spectrum selector and electrically connected to the control and data processing unit, while the focusing system is designed with a chromatic aberration of position on the indicated wavelengths.

The essence of the invention resides in the following. In the device as claimed in the invention the focusing system designed with chromatic aberration of position enables positioning and focusing of the light beam emitted on two different wavelengths within the multilayer optical disc such that the focusing planes for these wavelengths are separated at distance S. The claimed device is intended for recording/erasing/reading information on a multilayer optical disc consisting of alternating layers of photochromic and transparent materials. It would be appropriate to use, say, a polymer with a maximum optical transparency on wavelengths $\lambda 1$ and $\lambda 2$ as the transparent material and use as the photochromic material, say, a fulgide placed in a polymer matrix and capable of changing its optical properties when exposed to radiation with wavelengths $\lambda 1$ and $\lambda 2$, and more specifically, upon exposure to a light with wavelength $\lambda 1$ in its initial state, developing a capacity to fluoresce if exposed to a light with wavelength $\lambda 2$ within a wide spectral range conventionally denoted $\lambda 3$, whereas when exposed to light with wavelength $\lambda 2$ in its changed state it can fluoresce and return to its initial state while losing the said fluorescent properties in the process. The thickness of an individual layer of the photochromic material in a multilayer optical disc is from one to several microns, and that of the individual layer of the transparent material $\lambda$, from several microns to tens of microns. It would be appropriate to choose the value of chromatic aberration of position of the focusing system S to be equal to $\delta/2$.

The spatial separation of the focusing regions of the light emitted on wavelengths λ1 and λ2 makes it possible, due to a certain chromatic aberration of position of the focusing system, to implement a unique condition involving interaction of a two-frequency radiation with the substance when recording, erasing and reading information on deep-lying photochromic layers of the optical disc, which minimizes the effects of the cross-talk of the higher photochromic layers and erasure of information during read-out. This condition is implemented through simultaneous irradiation of the multilayer optical disc by a two-frequency radiation the ratio of intensities of the spectral components of which is equal to the ratio of wavelengths of the same spectral components. For example, during recording of data the absorption of radiation on wavelength λ1 and transition of the photochromic material to a changed state can also occur not only in the signal photochromic layer, but also in other layers through which the recording beam is propagating. This results in ghost records. The radiation with wavelength λ2 of appropriate intensity stimulates the return of the photochromic material to its initial state in the layers where no recording is being made with the result that the ghost records that occur therein disappear. In case of simultaneous irradiation with light on wavelengths λ1 and λ2, the ratio of intensities of spectral components of which is equal to the ratio of the wavelengths of these spectral components, the photochromic material is always in its initial state thus keeping the photodynamic equilibrium. The intensities of spectral components of radiation having wavelengths λ1 and λ2 can be controlled by independently changing their passage using a controlled spectral selector.

BRIEF DESCRIPTION OF THE DRAWINGS

The nature of the invention can best be understood by reference to the relevant drawings.

DETAILED DESCRIPTION OF THE PREFERRED EMBODIMENTS

Figure 1:
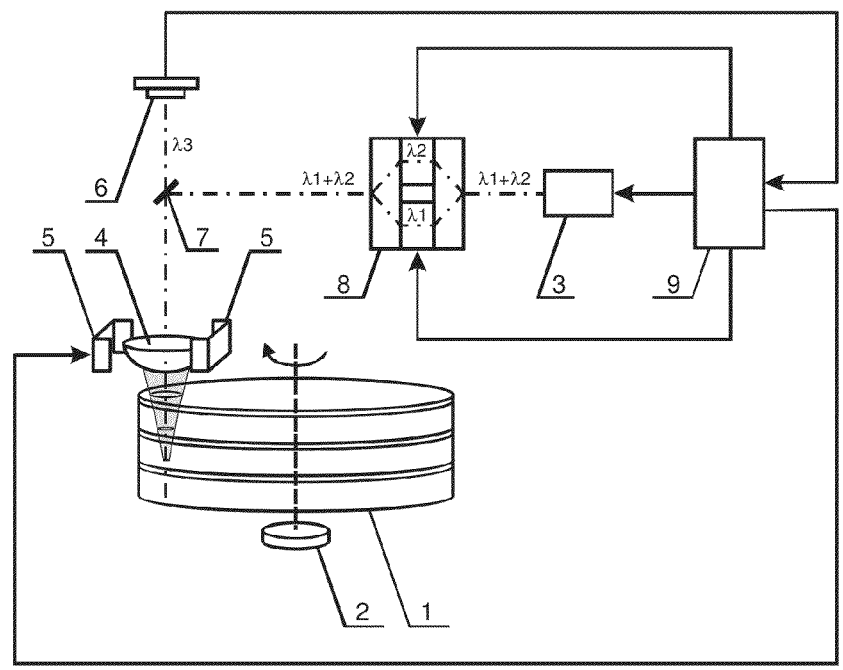
FIG. 1 is a diagram of the claimed device.

FIG. 1 shows multilayer optical disc 1, optical disc positioning system 2, radiation source 3 with two different wavelengths, λ1 and λ2, focusing system 4 with chromatic aberration of position at wavelengths λ1 and λ2, means 5 for positioning focusing system 4, optical sensor 6 designed so that it can register a fluorescence radiation on wavelength λ3, spectrum splitter 7 capable of reflecting the radiation on wavelengths λ1 and λ2 and passing that on wavelength λ3 as well as controlled spectrum selector 8 capable of independently controlling the passage of radiation on wavelengths λ1 and λ2. Besides, the diagram shows control and data processing unit 9 electrically interfaced with radiation source 3, positioning means 5 of focusing system 4, controlled spectrum selector 8 and optical sensor 6.

Figure 2:
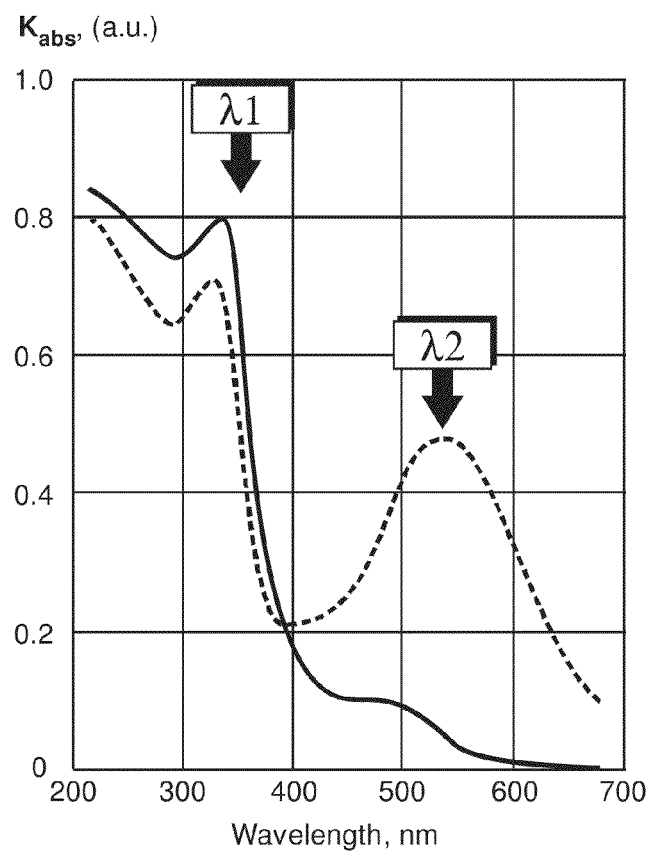
FIG. 2 shows the characteristic absorption spectra of the photochromic material in its initial (solid line) and changed (dashed line) states.

As may be seen from FIG. 2, the absorption spectra of the photochromic material in the initial (solid line) and changed (dashed line) states appreciably differ. In its initial state, the photochromic material exhibits the maximum absorption capacity in the ultraviolet region of the spectrum. When exposed to a radiation with wavelength λ1, which corresponds to the short-wave peak of the absorption line, the photochromic material turns from the initial state to the changed one. Its absorption spectrum in this case is distorted: the short-wave maximum of the line decreases, and, conversely, the long-wave one located in the middle of the visible band increases. In its changed state the photochromic material develops, when exposed to a radiation having wavelength and corresponding to the long-wave peak of absorption, a capacity to fluoresce. In the event of fluorescence, the photochromic material partially returns to its initial state. The recording of data on multilayer optical disc 1 is accomplished by irradiating with light having wavelength λ1. As multilayer optical disc is simultaneously irradiated on wavelengths λ1 and λ2, the photochromic material does not change its state, provided the ratio of intensities of radiation on such wavelengths is equal to the ratio of the wavelengths.

Figure 3:
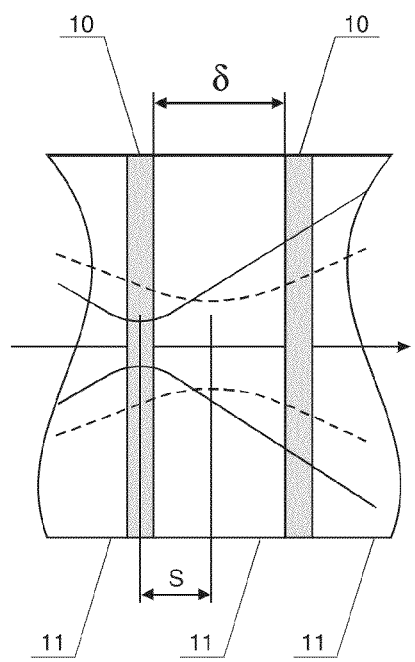
FIG. 3 is a detailed diagram showing the intersection of the light beams having wavelengths λ1 (solid line) and wavelength λ2 (dashed line) inside a multilayer optical disc. The diagram indicates the thickness of the transparent material layer, λ, and chromatic aberration of position of the focusing system, S.

FIG. 3 is a detail view of multilayer optical disc with photochromic material layers 10 and transparent material layers 11 as well as regions of radiation focusing on wavelengths λ1 (solid line) and λ2 (dashed line). In the optical systems having chromatic aberration, the focusing plane of the long-wave portion of the radiation spectrum is located at a greater distance from the last optical component than the focusing plane of the shortwave portion of the radiation spectrum. Distance S between the focusing planes of the radiation with wavelengths λ1 and λ2 in the claimed device should be preferably made twice as less as thickness λ of transparent layer 11 of multilayer optical disc 1.

Figure 4:
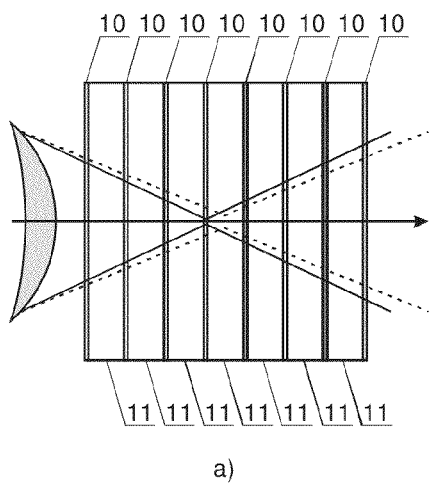
FIG. 4 is a general diagram showing the intersection of the light beams having wavelengths λ1 (solid line) and λ2 (dashed line) inside a multilayer optical disc (a) and a chart corresponding to this geometry and illustrating the ratio of the areas of the light beams having wavelengths λ1 and λ2 (b) in the data recording mode.
Figure 4:
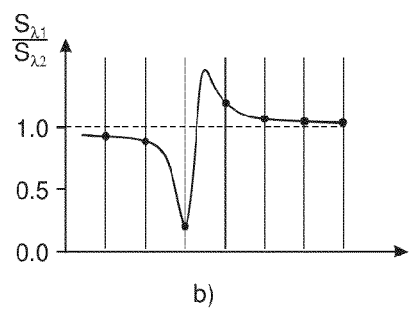
Figure 5:
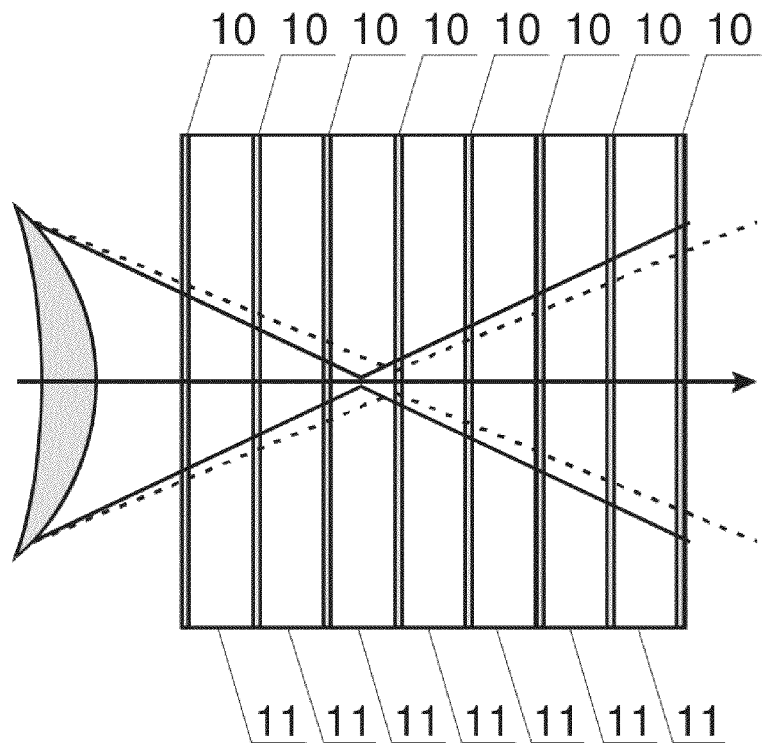
FIG. 5 is a general diagram showing the intersection of the light beams having wavelengths λ1 (solid line) and λ2 (dashed line) inside a multilayer optical disc (a) and a chart corresponding to this geometry and illustrating the ratio of the areas of the light beams having wavelengths λ1 and λ2 (b) in the data reading or erasing mode.
Figure 5:
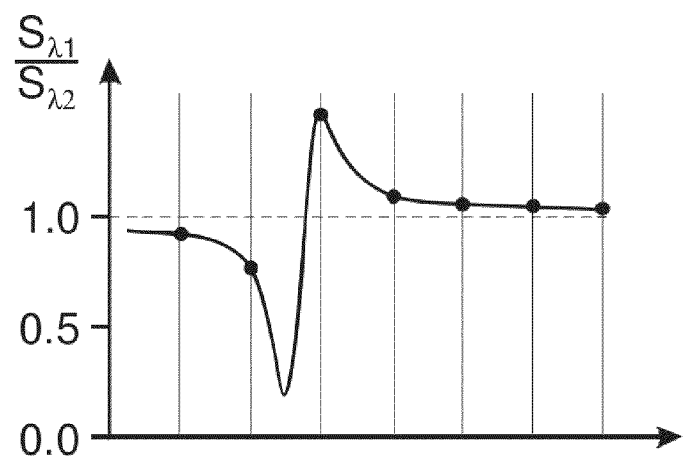

FIGS. 4 and 5 are general diagrams showing the intersection of the radiation beams having wavelengths λ1 (solid line) and λ2 (dashed line) inside multilayer optical disc 1 in the data recording (FIG. 4a) as well as reading or erasing (FIG. 5a) modes. In the data recording mode, the beam of the recording radiation having wavelength λ1 is positioned and focused onto photochromic material layer 10 (see also FIG. 3), while the beam of the reading/erasing radiation having wavelength λ2 is positioned and focused, due to the presence of chromatic aberration of focusing system 4, approximately onto the mid-thickness of the adjacent succeeding transparent layer 11.

In the data reading/erasing modes, the beam of reading/erasing radiation having wavelength λ2 is focused on photochromic material layer 10, and, conversely, the beam of recording radiation having wavelength λ1 is positioned and focused approximately onto the mid-thickness of the adjacent preceding transparent layer 11.

As may be seen from the charts presented in FIGS. 4b, 5b, the areas of the beams of the spectral components of radiation with wavelengths λ1 and λ2 are practically equal to each other throughout the depth of optical disc 1 and markedly differ only when they are in the immediate vicinity of the photochromic material layer used for recording, reading or erasure of information. Should a multilayer optical disc be simultaneously exposed to radiation on wavelengths λ1 and λ2 with the ratio of their intensities ensured to be equal to the ratio of the wavelengths, the information contained in the pixels of the photochromic layers will not change when read out off the signal photochromic material.

In the example presenting the best embodiment of the claimed device it is suggested to use multilayer optical disc 1 made up of alternating layers of a transparent material, say, polycarbonate, the thickness of one individual layer being about 100 microns, and layers of a photochromic material, say, polycarbonate, comprising the photochromic fulgide complex, spirobenzopyran, having two stable forms, spiropyran and merocyanine, the thickness of individual layer being about 5 μm. A suggested source of radiation, 3, having two wavelengths, λ1 and λ2, is a solid-state laser based on the crystal of NdYVO4, with the radiation transformed into the second (λ2=0.532 μm) and third (λ=0.355 μm) harmonics. A suggested controlled spectrum selector, 8, is an optical unit comprising an input spectrum splitter separating the paths of the beams of radiation on wavelengths λ1 and λ2, two independently controllable electro-optical modulators arranged, respectively, in the optical paths of the light having wavelengths λ1 and λ2, and an output spectrum splitter integrating the paths of the light beams with wavelengths λ1 and λ2 after these have passed through the controllable electro-optical modulators. As focusing system 4, it is suggested to use a lens module with a large numerical aperture and spherical aberration control and monitoring means ensuring a preset chromatic aberration of position on wavelengths λ1 and λ2. Positioning means 5 of focusing system 4 are suggested to be made in the form of a controllable electromagnetic suspension ensuring the displacement of one or more optical components of focusing system 4 along the optical axis for selection of the signal photochromic layer of multilayer optical disc 1 to be used for recording, reading and erasing information. A dichroic mirror is suggested to be used as spectrum splitter 7.

Embodiment of the Invention

Multilayer optical disc 1 is placed, with use of positioning system 2, in a position as may be required for recording, erasing or reading information. The light having wavelengths λ1 and λ2 passes from radiation source 3 through controlled spectrum selector 8 at whose output the required ratio of intensities of the light beams having wavelengths λ1 and λ2 are preset. Then the light is directed through spectrum splitter 7 to focusing system 4 whose position is set with the aid of positioning means 5. Said means 5 position the focusing regions of the light beams with wavelengths λ1 and λ2 inside multilayer optical disc 1 and adjust focusing system 4 to compensate the arising spherical aberration. The recording, erasing or read-out of information is performed by changing the intensities of radiation on the respective wavelength using controlled spectrum selector 8. When information is recorded, the power of radiation on wavelength λ1 is maximum, and that on wavelength λ2 is minimum; when information is erased, the power of radiation on wavelength λ1 is maximum, and that on wavelength λ2 is minimum; when information is read out the ratio of power of radiation on wavelength λ1 to that on wavelength λ2 equals λ1/λ2 and is within 0.2-0.7. The read-out of the recorded information is performed by registering the fluorescence radiation on wavelength λ3 induced by the radiation having wavelength λ2 in those pixels of photochromic material signal layer 10 which have been first irradiated with wavelength λ1. Some portion of the fluorescence radiation emitted by these pixels enters the aperture of focusing system 4 wherefrom it passes via spectrum splitter 7 to the input of optical sensor 6.

The significant distinction of the claimed device from the prototype lies in the use of controlled spectrum selector 8 enabling independent control of the passage of the light having the wavelengths generated by radiation source 3, while the focusing system is designed with a preset chromatic aberration of position on said wavelengths. The task set before the invention is solved by the fact that during the read-out of the pre-recorded data two processes occur in the information layers of the photochromic material of multilayer optical disc 1, erasure of the information by the reading beam and its recording by the recording beam. At the same time, a certain ratio of intensities of these two beams ensures stability of the optical condition of the photochromic layers of the optical disc.

The claimed device is markedly more efficient than the prototype. This is because the choice of the photochromic materials that may be used to form the information layers of multilayer optical disc 1, specifically, one-photon photochromes, is wider, and the demands on the quality of the surface and homogeneity of the disc material are not stringent.

It should be stressed that the claimed device is based on the layer-by-layer recording/erasing/reading principles used with the existing DVD drives. So the embodiment of the invention requires no redesigning the existing drive system, only its upgrading. The positive effect is achieved through changing the monochromic radiation source to a source or a combination of sources using different wavelengths and adding an extra controlled spectrum selector and a focusing system with a preset chromatic aberration of position.

What is claimed is:

1. A device for recording/erasing/reading information on a multilayer optical disc, comprising an optical disc positioning system, two sources of radiation having different wavelengths and optically coupled with the focusing system provided with positioning means, an optical sensor optically coupled with the focusing system via a spectrum splitter, as well as a control and data processing unit electrically connected to the radiation source, focusing system positioning means and optical sensor, wherein said device comprises an controlled spectrum selector at whose output the required ratio of intensities of the light beams can be set for each of the two wavelengths, and wherein said selector is arranged between the source of radiation and spectrum splitter and electrically connected to the control and data processing unit, while the focusing system is designed with a chromatic aberration of position on the indicated wavelengths.

* * * * *